(12) United States Patent
Holden et al.

(10) Patent No.: US 7,752,077 B2
(45) Date of Patent: Jul. 6, 2010

(54) METHOD AND SYSTEM FOR AUTOMATED COMPARISON OF ITEMS

(75) Inventors: Jeffrey A Holden, Seattle, WA (US); Lawrence G Tesler, Seattle, WA (US); Ron Kohavi, Issaquah, WA (US)

(73) Assignee: Amazon Technologies, Inc., Reno, NV (US)

( * ) Notice: Subject to any disclaimer, the term of this patent is extended or adjusted under 35 U.S.C. 154(b) by 1373 days.

(21) Appl. No.: 11/041,522

(22) Filed: Jan. 21, 2005

(65) Prior Publication Data

US 2006/0167757 A1 Jul. 27, 2006

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 7,237,187 B2 | 6/2007 | Neal | |
| 2002/0019763 A1 | 2/2002 | Linden et al. | |
| 2003/0145277 A1 | 7/2003 | Neal | |
| 2004/0015415 A1 | 1/2004 | Cofino | |
| 2004/0019536 A1* | 1/2004 | Ashkenazi et al. | 705/27 |
| 2004/0143508 A1 | 7/2004 | Bohn | |

FOREIGN PATENT DOCUMENTS

| | | |
|---|---|---|
| KR | 2000-36359 A | 7/2000 |
| KR | 2003-75219 A | 9/2003 |
| WO | 00/17793 A1 | 3/2000 |
| WO | 2004/010362 A1 | 1/2004 |

OTHER PUBLICATIONS

U.S. Appl. No. 10/864,288, filed Jun. 9, 2004, Lee et al.
"Investor Relations: Press Release," Amazon.com, Nov. 28, 2000 <http://phx.corporate-ir.net/phoenix.zhtml?c=97664&p=IROL-NewsText&t=Regular&id=135197> [retrieved Jul. 7, 2004].
"Amazon: Cell Phones & Service/Phones," Amazon.com, © 1996-2004, <http://amazon.com /exec/obidos/handle-generic-form /ref=wr_d_301187_qc/103-7194743-1769466?...> [retrieved Jul. 1, 2004].

(Continued)

*Primary Examiner*—Mila Airapetian
(74) *Attorney, Agent, or Firm*—Christensen O'Connor Johnson Kindness PLLC

(57) ABSTRACT

An automated method and system for providing an item comparison includes identifying a first item and a set of one or more other items for comparison with the first item, prioritizing attributes of the first item and the other items, and providing the item comparison with prioritized attributes to a user. Identifying comparable items may involve a multiple step process in which a candidate set of items is first selected for possible comparison with the first item, and thereafter selecting one or more items from the candidate set for comparison. Prioritizing the attributes of the items may include measuring like attributes of the items against each other and arranging the attributes to appear in an order according to the degree the like attributes distinguish the items from each other. A modified item comparison may be prepared and provided in accordance with user feedback.

89 Claims, 7 Drawing Sheets

OTHER PUBLICATIONS

"Yahoo! Shopping Digital Camera SmartSort," Yahoo.com, © 2004, <http://shopping.yahoo.com/sort_tool_digicamera> [retrieved Oct. 29, 2004].

"Apple Store," Apple.com, © 2004, <http://store.apple.com/1-800-MY-APPLE/WebObjects/appleStore.woa/> [retrieved Oct. 13, 2004].

"Endeca Search Guided Navigation," Endeca.com, © 2000-2006, <http://endeca.com/demos/demo.html> [retrieved Feb. 28, 2006].

"BestBuy: Compare Products," *Best Buy*, © 2003-2004, <http://www.bestbuy.com/olspage.jsp?id=cat04002&type=category&parentCatID=false&initialize=f...> [Tetrieved Jan. 10, 2005].

Notice of Grounds for Rejection mailed Jun. 15, 2009, in corresponding Korean Application No. 10-2007-7018511, filed Jan. 20, 2006, 23 pages.

Supplementary European Search Report mailed Jan. 4, 2010, issued in corresponding European Patent Application No. EP 06 71 9181.7, filed Jan. 20, 2006.

* cited by examiner

METHOD AND SYSTEM FOR AUTOMATED COMPARISON OF ITEMS

FIELD OF THE INVENTION

The present invention relates to computer-implemented methods and systems for providing item comparisons to users.

BACKGROUND OF THE INVENTION

With the expanding use of computer networks, such as the Internet, an increasing amount of commerce is conducted electronically. Online merchants, manufacturers, and others have made virtually every type of product and service available to consumers via computer networks. Conducting commerce via computer networks is particularly useful because consumers can more easily obtain information regarding items to assist them in their purchasing decisions.

Nevertheless, at the present time, consumers still face many challenges when they wish to identify, review, and compare competing items as they make their purchasing decisions. In many circumstances, consumers are required to identify and visit multiple information sources, such as Web sites, to obtain information on different items, and further print out information for each of the items, to be able to compare the items. An effective comparison of items is sometimes extremely difficult, particularly when consumers do not know beforehand the identity of competing items to compare. Even if competing items are all available at a single merchant Web site, for example, the competing items may not be displayed on the same page, or if they are, an effective side-by-side comparison of the items is not provided.

Online merchants, manufacturers, and others using prior art technologies have attempted to provide consumers with side-by-side comparisons of items by asking consumers to specify (i.e., by checking a checkbox, etc.) items to compare, and then providing a Web page to the consumer displaying the items together on the same page. To facilitate the comparison, the consumer is typically presented with a table in which each column of the table is dedicated to an item and each row of the table identifies an attribute shared by the items. Under each item column in the table, information is provided to the consumer regarding the attributes of the items.

When providing an item comparison of this type, online merchants, manufacturers, and others will have previously identified and arranged the attributes as they wish them to be displayed to the consumer. Depending on the party doing the arranging, certain attributes may be emphasized in that party's self-interest without particular consideration to the attributes that truly distinguish the items or attributes that are more important to the consumer. Some comparison tables provide pages and pages of attributes that are difficult for consumers to wade through to identify pertinent distinctions between the compared items. Furthermore, as previously noted, for a consumer to obtain an item comparison, the consumer is required to already know which items are comparable and susceptible to comparison, and then designate those items for the comparison. In yet other circumstances, a consumer may be given a prearranged comparison table that has been generated and stored by a selling party, but such tables are static and possibly biased in that the tables include only those items previously selected by the selling party for the comparison.

What is needed is a system and method that can automatically generate item comparisons that are relevant to the consumer receiving the item comparison, and further present the compared items with distinguishing attributes prioritized for the benefit of the consumer. The present invention is directed to systems and methods that address the problems noted above and other shortcomings in the prior art.

SUMMARY OF THE INVENTION

Embodiments of the present invention are directed to methods and systems that provide comparisons of items to users. According to one exemplary method of the invention, a computing system prepares the item comparison by identifying a first item for the comparison and then identifying a set of one or more other items to compare with the first item. Processes for identifying the items in the comparison set of items are performed automatically or semi-automatically, typically without requiring user identification of the comparable items.

In some embodiments, the first item for the item comparison is identified by the user when requesting the item comparison. In other embodiments, the first item is identified by the computing system, possibly from a type of item indicated by user activity when requesting the item comparison. A user (or the computing system) may optionally designate the first item as an anchor item that remains in the item comparison until another anchor item is designated.

Any of a variety of algorithms may be used to identify the items in the set of items that are compared to the first item. In one embodiment, the comparison set of items is identified based on data reflecting prior user activity in regard to the items at issue. Prior user activity may include, for example, a browse history comprising a record of one or more other items viewed or considered by one or more users who also viewed the first item. In other circumstances, the prior user activity may include a purchase history comprising a record of one or more other items purchased by one or more users who previously viewed the first item. Alternatively, the prior user activity may include a purchase history comprising a record of one or more other items viewed by one or more users who previously purchased the first item. In yet other circumstances, the prior user activity may be analyzed and limited to user activity in regard to items that belong to a same item category as the first item.

In other embodiments, the set of items that are compared to the first item may be identified by analyzing attributes associated with the first item and selecting one or more other items that share like attributes with the first item.

Yet other embodiments may identify the comparison set of items by searching pages having recognized text therein for reference to the first item, after which identifying other items referenced in relation to the first item. The pages may be comprised of images of printed pages on which a character recognition process has been applied (if needed) to recognize and store the text in the page images. Still another embodiment for identifying the items in the comparison set includes searching pages available at multiple sites on a computer network, such as the Internet, for pages that reference the first item, and then identifying other items referenced in relation to the first item.

If desired, a process for identifying the one or more items in the comparison set may involve a multiple step method in which a candidate set of items is selected for possible comparison with the first item, after which one or more items are selected from the candidate set for actual comparison with the first item. The items in the candidate set of items may be selected based on measurements of like attributes of the items at issue and selecting those items having attributes that collectively are more similar to the attributes of the first item. Thereafter, one or more items from the candidate set of items may be selected for actual comparison with the first item based on attributes that collectively are most similar to the first item. In some circumstances attributes may be weighted such that the attributes having a greater weight will have greater influence for item selection than attributes having lesser weight.

In another aspect, embodiments of the present invention may include prioritizing the attributes of the first item and the other items in the comparison set, typically for later display to a user. Prioritizing the attributes of the items may include measuring like attributes of the items in the item comparison against each other and arranging the attributes to appear in an order according to the degree the like attributes distinguish the items from each other. If desired, the attributes may be weighted such that attributes having greater weight will have greater influence on the ordering of the attributes than attributes having lesser weight.

Once the item comparison is provided to the user, feedback regarding the item comparison may be received from the user. In response thereto, some embodiments of the invention provide a modified item comparison to the user in accordance with the user's feedback. For example, a user's feedback may designate another item to be the first item with which other items are compared. One method of the invention may comprise preparing and providing a modified item comparison based on the newly-designated first item.

In another example, a user's feedback may indicate an attribute of interest to the user. A user may indicate an attribute of interest by clicking on or hovering a mouse pointer over the attribute in the item comparison. A method according to the invention may comprise preparing and providing a modified item comparison in which the items that are compared to the first item include those items that are most similar to the first item with respect to the attribute of interest. Yet another method according to the invention responds to user feedback indicating an attribute of interest by rearranging the attributes in the item comparison in an order where the attribute of interest is shown higher in the order than other attributes. A blended approach may also be applied in which attributes of items are prioritized for display in an item comparison based on a combination of attributes that better distinguish the items from each other and attributes determined to be of greater user interest.

Other embodiments of methods and systems according to the invention recognized by persons having ordinary skill in the art based on the disclosure herein are considered part of the present invention.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The present invention is directed to computer-implemented methods and systems that provide automated comparisons of items, typically generated in real time when a request for an item comparison is received from a user. Although specific embodiments will now be described with reference to the drawings, these embodiments are intended to illustrate, and not limit, the present invention. For example, although the specific embodiments described herein involve the generation and display of data showing a comparison of digital cameras, embodiments of the invention may be applied to virtually any other type of items (which may include, for purposes of illustration and without limitation of any kind, products, goods, apparatus, devices, services, service plans, benefit plans, and/or any other entities having comparable attributes, including web sites, businesses, securities, companies, people, etc.). Moreover, method steps described herein may be interchanged with other steps, or combination of steps, and still achieve the advantages of the present invention. Accordingly, the scope of the invention should not be determined from the following description but instead from the claims that follow.

Figure 1:
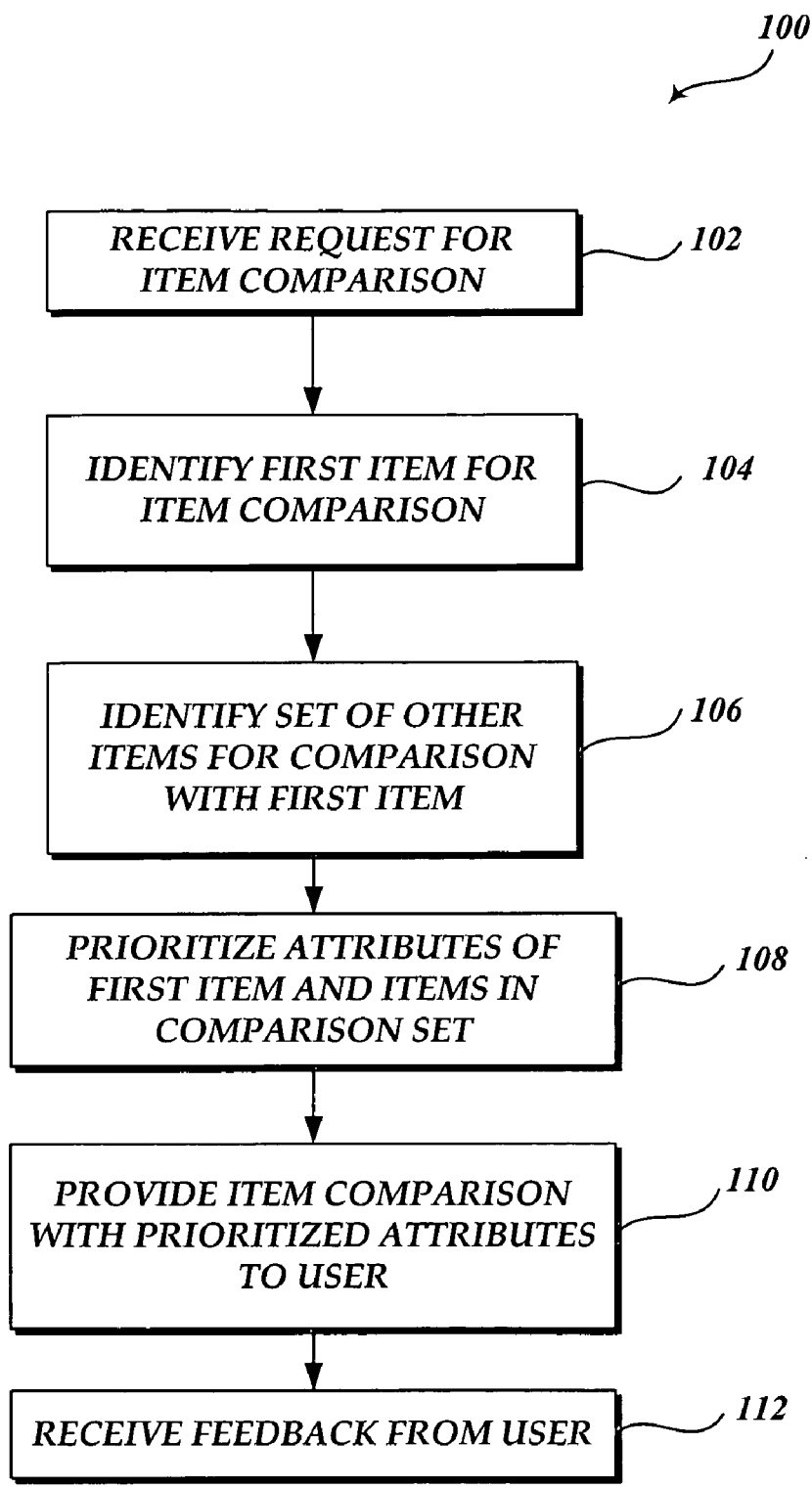
FIG. 1 is a flow diagram illustrating one exemplary embodiment of a method for automated comparison of items conducted in accordance with the present invention.

FIG. 1 is a flow diagram of one exemplary method 100 that provides an automated item comparison in accordance with the present invention. Briefly summarized, the method 100 begins by receiving a request for an item comparison, as indicated at block 102. At block 104, the method 100 identifies a first item for the item comparison. With the first item in mind, the method 100 continues at block 106 to identify a set of one or more other items for comparison with the first item. Once the first item and the comparison set of other items are identified, the method 100 prioritizes the attributes shared by the first item and the items in the comparison set, as indicated at block 108. At block 110, the method 100 provides the item comparison with the prioritized attributes to the user. Optionally, the method 100 may subsequently receive feedback from the user regarding the item comparison, as indicated at block 112. Along with further details regarding each aspect of the method 100, described herein are exemplary screen shots of Web pages (FIGS. 4 and 5) that may be generated when providing an item comparison to a user. Also described herein is a depiction of one exemplary computing environment (FIGS. 2 and 3) in which methods and systems of the present invention may be implemented.

Returning to block 102 in FIG. 1, a request for an item comparison may come from a user by explicit or implicit user action, or it may come from a computing system that determines it would be helpful to provide an item comparison to the user. The computing system may, for example, observe a user's activity with respect to browsing of items on the computing system to determine when an item comparison would be helpful.

Figure 4:
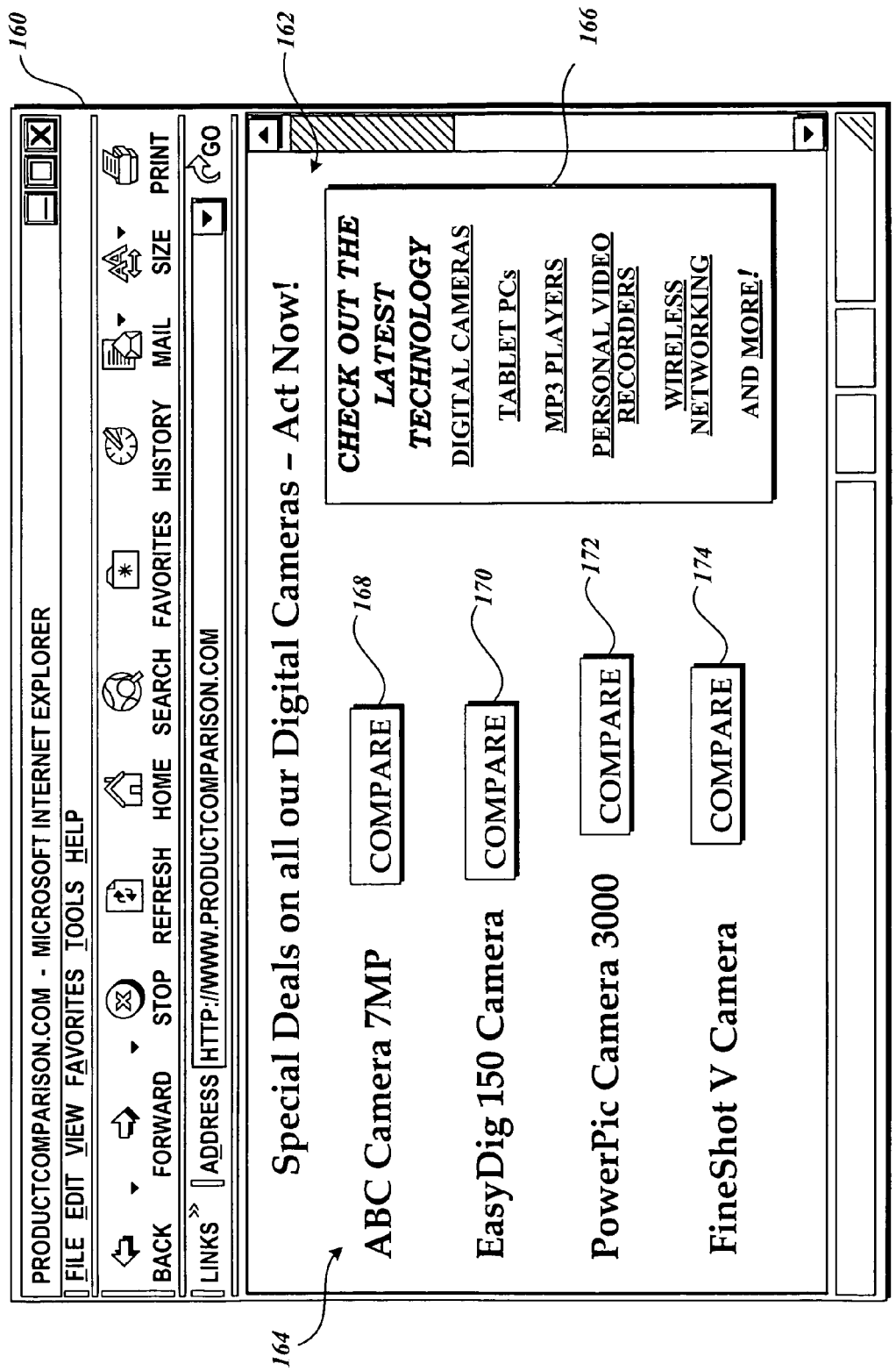
FIG. 4 illustrates an exemplary Web page showing a list of items, each having a control that enables a user to launch an automated comparison of items that are selected, arranged, and presented in real time.

For example, FIG. 4 illustrates an exemplary Web browser 160 having a display space for depicting a Web page 162. The Web page 162, in this example, features a list of items 164 that, in this case, are digital cameras. Each of the digital cameras 164 is shown associated with a control 168, 170, 172, and 174 which, in this example, are buttons labeled "Compare." A user may request an item comparison by actuating any one of the Compare buttons 168, 170, 172, or 174.

When a request for an item comparison has been received, the method 100 proceeds from block 102 to identify a first item for the item comparison, as indicated at block 104 in FIG. 1. In some embodiments, the first item may be identified by the user in the request for the item comparison. For example, in reference to FIG. 4, a user may actuate the Compare button 172 that is associated with an item titled "PowerPic Camera 3000." In such a circumstance, the method 100 may designate the "PowerPic Camera 3000" as the first item for purposes of preparing an item comparison.

In other embodiments of the method 100, the first item may be automatically identified by the computing system, possibly in reference to a type of item (e.g., digital cameras) that the user may be browsing or considering when requesting the item comparison. For example, the user may be browsing software titles, such as antivirus software, offered by an online merchant. The online merchant may include a "Compare" button (e.g., similar to the Compare buttons 168, 170, 172, and 174, shown in FIG. 4) on a portion of the merchant's Web site featuring antivirus software. User activation of a "Compare" button on the antivirus software Web page indicates to the computer system that the user desires to receive an item comparison for antivirus software. Based on the type of item indicated by the user (here, antivirus software), the method 100 may select one of the antivirus software titles to be the first item for purposes of preparing the item comparison. Any one of a number of methods may be used to select an item for designation as the first item, e.g., by random, by highest sales rank, by user viewing data, by greatest popularity, by most favorable user reviews, etc.

Once the first item for the item comparison is identified, the first item may be designated as an anchor item in the item comparison. As will be described in more detail below, the process of preparing and providing an item comparison to a user may be iterative, wherein for each iteration of the item comparison, the anchor item may remain in the item comparison while different items are compared to the anchor item. The anchor item remains in the item comparison until another item is designated as the anchor item.

Regardless of whether the first item is designated as an anchor item, the method 100 proceeds at block 106 to identify a set of one or more other items for comparison with the first item. This set of items may be identified in any of a number of ways, examples of which are provided herein. The set of items to be compared with the first item (also referred to herein as the comparison set of items) generally includes items having attributes that are comparable to the attributes of the first item. Furthermore, in typical embodiments, the items in the comparison set of items are not identified until after the first item is identified. In this manner, a real time automated comparison of items can be prepared after an item comparison is initiated.

In some embodiments, the comparison set of items may be identified based on data reflecting prior activity of one or more users with a computing system in regard to the items. For example, a computing system may operate a merchant Web site that observes activity by users who are viewing the items offered by the merchant. Such user activity may include, without limitation, click stream data that reflects, in whole or in part, browsing activity of users. This data may be stored in a browse history that records relationships between the items viewed by the users. A browse history may include such information as click stream and browse data, including items actually clicked on by a user, items over which the user simply allowed a pointer to hover, items otherwise indicated of interest by virtue of user activity, etc.

In some embodiments, relationships between items may be determined from user activity based on methods and systems described in U.S. Patent Publication No. US 2002/0019763 A1 ("the '763 publication"), published Feb. 14, 2002, which is incorporated herein by reference. FIG. 3B of the '763 publication, for instance, and corresponding description in the '763 publication describes a process in which items that may be similar or related may be identified. Specifically, comparable items are identified by determining items that have been viewed by users in the same session-specific browsing histories of the users. An item may be determined comparable to another item when a number of users who viewed the item also viewed the other item during the same browsing session. For purposes of the method 100 described herein, the comparison set of items may be identified based on data reflecting items that one or more users have viewed in the same browsing session as the first item (identified in block 104). Browse histories can be considered a reliable measure of relatedness of items because users viewing items in the same browsing session tend to view items that are related to each other.

Generally, it may be desired to limit the analysis of prior user activity to items that belong to a same item category as the first item. For instance, users who are viewing computer printer items may also view ink products in the same browsing session. Ink products are not comparable to computer printers for providing item comparisons. Accordingly, the analysis described in the '763 publication may be modified to differentiate and exclude prior user activity in regard to items that do not belong to the same category of item as the first item.

Any of a variety of other similarity metrics may be used to identify items for comparison to the first item. In addition or alternative to using browse histories of users to identify comparable items, the method 100 may use histories of prior user purchases to identify comparable items. For example, the method 100 may analyze data reflecting prior user activity showing one or more other items purchased by users who previously viewed the first item (identified in block 104). Similarly, the method 100 may analyze prior user activity showing one or more other items that were viewed by users who purchased the first item. The basis for using purchase histories is that users tend to view comparable items prior to selecting one of the items for purchase. As with user browse history data, an analysis of user purchase history data may be limited to data associated with items that belong to a same category of items as the first item. In that manner, complementary items, such as printers and printer ink that may be viewed and/or purchased in the same browsing session can be differentiated.

Another algorithm that may be used to identify one or more items for comparison with the first item may rely on known attributes of the first item. An electronic catalog, for example (or other collection or database of items), may associate attributes with each of the items in the catalog. Items that are comparable to the first item may be identified by analyzing attributes associated with the first item and then selecting one or more other items from the electronic catalog that share like attributes with the first item. Either single attributes or collections of attributes may be used in this algorithm. For example, if the first item is a digital camera, a collection of attributes such as "effective pixels", "optical zoom", and "autofocus" may be found associated with comparable digital cameras and not other items. The actual values of such like attributes may also be analyzed to identify those items that are most comparable to the first item. A multiple two-step process for selecting a candidate set of items for possible comparison with the first item, and then selecting a set of one or more comparison items from the candidate set based on like attributes is further described below.

Yet another algorithm that may be used to identify comparable items for comparison with the first item may include searching pages having recognized text in said pages for references to the first item. Those pages having text referencing the first item are then analyzed to identify other items referenced in relation to the first item. A filter may be applied to the resultant identified items to capture those items that belong to a same item category as the first item.

Either individual pages or collections of pages may be used in this algorithm. For example, a magazine article may review an item and reference several competing items in the same article. The pages of the magazine article, having been stored in a database of pages, are searched to identify those pages that reference the first item. Comparable items are then derived from analyzing the text of the pages on which the first item is referenced, and possibly other associated pages (e.g., pages belonging to a same magazine article, etc.).

U.S. patent application Ser. No. 10/669,088, filed Sep. 23, 2003 ("the '088 application"), commonly owned with the present application and incorporated by reference herein, describes a computer system having access to images of printed pages, such as the pages of books, magazines, manuals, documents, articles, newsletters, newspapers, journals, etc., whether originating on paper or in electronic printed form. According to the processes described therein, the text in the page images may be subjected to a recognition process, such as an optical character recognition process, to produce recognized text. The recognized text of each page is associated with the page image from which it comes and is indexed to enable searching of the text in the page images. Embodiments of the invention that search pages in this manner, in addition or alternative to searching pages as previously described, are often able to search a wider base of information and identify comparable items. Further information concerning other features of searching page images as described above is found in the '088 application.

Searching of pages to identify comparable items may further include searching pages available at multiple sites on a computer network, such as the Internet or other global, wide area, or local area networks. Such pages available on a computer network may include, but are not limited to, word processing documents, Web pages, documents in portable document format, etc. Pages available at the multiple sites on a computer network are searched to identify those pages that reference the first item. The pages that reference the first item are then analyzed to identify other items referenced in relation to the first item. In some embodiments, other items may be considered as referenced in relation to the first item if the other items are referenced in the same page as the first item or in pages related to the page on which the first item is referenced (e.g., in a same magazine article).

If desired, identifying a set of one or more other items for comparison with a first item may be performed in multiple steps. For example, in some embodiments, identifying a comparison set of items may first involve selecting a candidate set of items for possible comparison with the first item, and then from the candidate set selecting the comparison set of items.

Algorithms that cast a wider net may be used to select the candidate items for possible comparison with the first item. Filters, such as item categories, may be applied to the outcome of the algorithm(s) to limit the candidate set of items to a maximum number of items, e.g., 10 or 20 items, for example.

Generally, the items in the candidate set of items are selected for being more comparable to the first item than other items. For instance, items in the candidate set of items may be selected based on measuring like attributes of the items and selecting those items having attributes that collectively are more similar to the attributes of the first item than other items.

In a second step of the process, the items in the candidate set of items are analyzed to select one or more items for actual comparison with the first item. A similarity metric such as one measuring similar attributes values may be used to more tightly identify those items in the candidate set that are most similar to the first item. In this manner, the comparison set of items that is actually compared to the first item in the item comparison may be limited to a desired number, such as two or three items, for example.

Some attributes of an item may generally be considered more or less important to users than other attributes. For example, most if not all digital cameras will come with a strap that the user can use to secure the camera to their arm or neck. Accordingly, users may consider a strap attribute to be less important than, say, the price or effective number of pixels of the digital camera. Accordingly, in some embodiments, attributes of items may be weighted such that attributes having greater weight will have a greater influence for selection of the item than attributes having lesser weight.

A weighting of attributes may be applied in both the first step described above, for selecting a candidate set of items, as well as the second step described above, for selecting a comparison set of items. The weighting of attributes may be determined manually by human operators who designate attribute weights based on knowledge of user interests. Alternatively, or in addition, weighting of attributes may be determined programmatically by the computing system, e.g., by observing prior user activity tending to indicate attributes that are likely more important to users. For example, browse data including user search queries, click streams, and pointer activity may be examined to identify those attributes of the items that are more frequently searched, clicked on, or pointed to when users are browsing items. More frequently searched, clicked, or pointed to attributes may be considered more important and thus given greater weight. In one basic application, weighting of attributes may be accomplished by assigning numerical values that are included in a numerical evaluation of the items' attributes. Examples of numerical evaluations of attributes are described later herein.

In another aspect of the method 100, once the items in the comparison set (i.e., those items to be provided in an item comparison to the user) are identified, a prioritization process may be applied to the attributes in the item comparison, as indicated at block 108 in FIG. 1. In the prior art, consumers given item comparisons typically must wade through several pages of attributes and analyze each attribute to identify those attributes that truly distinguish the compared items from each other. Such distinguishing attributes may be buried within a display of other attributes that do not distinguish the items from each other. A further improvement to the automated item comparison described above is provided by sorting the attributes of the items in the item comparison to emphasize those attributes that better distinguish the compared items from each other.

In some embodiments, attributes that distinguish the items more from each other are arranged to appear higher in a list of attributes provided to the user in the item comparison. Prioritizing the attributes of the first item and the other items in the comparison set may include measuring like attributes of the items and arranging the attributes in an order according to the degree the like attributes distinguish the items from each other. Additional detail regarding example processes for prioritizing attributes of items is provided below in connection with a description of the sample item comparison shown in FIG. 5. The item comparison with the prioritized attributes is then provided to the user, as indicated at block 110 of FIG. 1.

Figure 2:
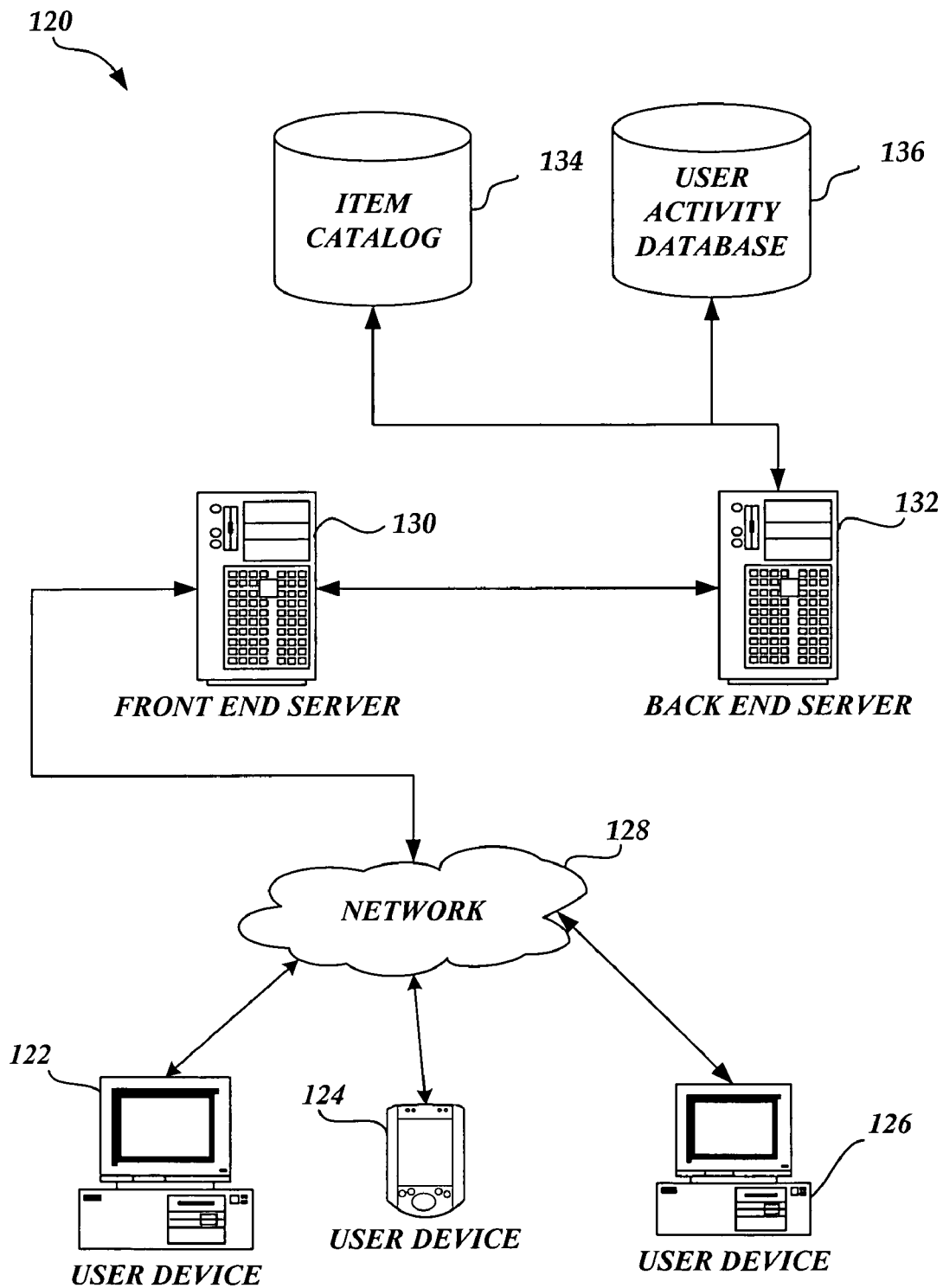
FIG. 2 is a pictorial diagram of one exemplary computing environment in which a method of the present invention, such as the method of FIG. 1, may be implemented.
Figure 5:
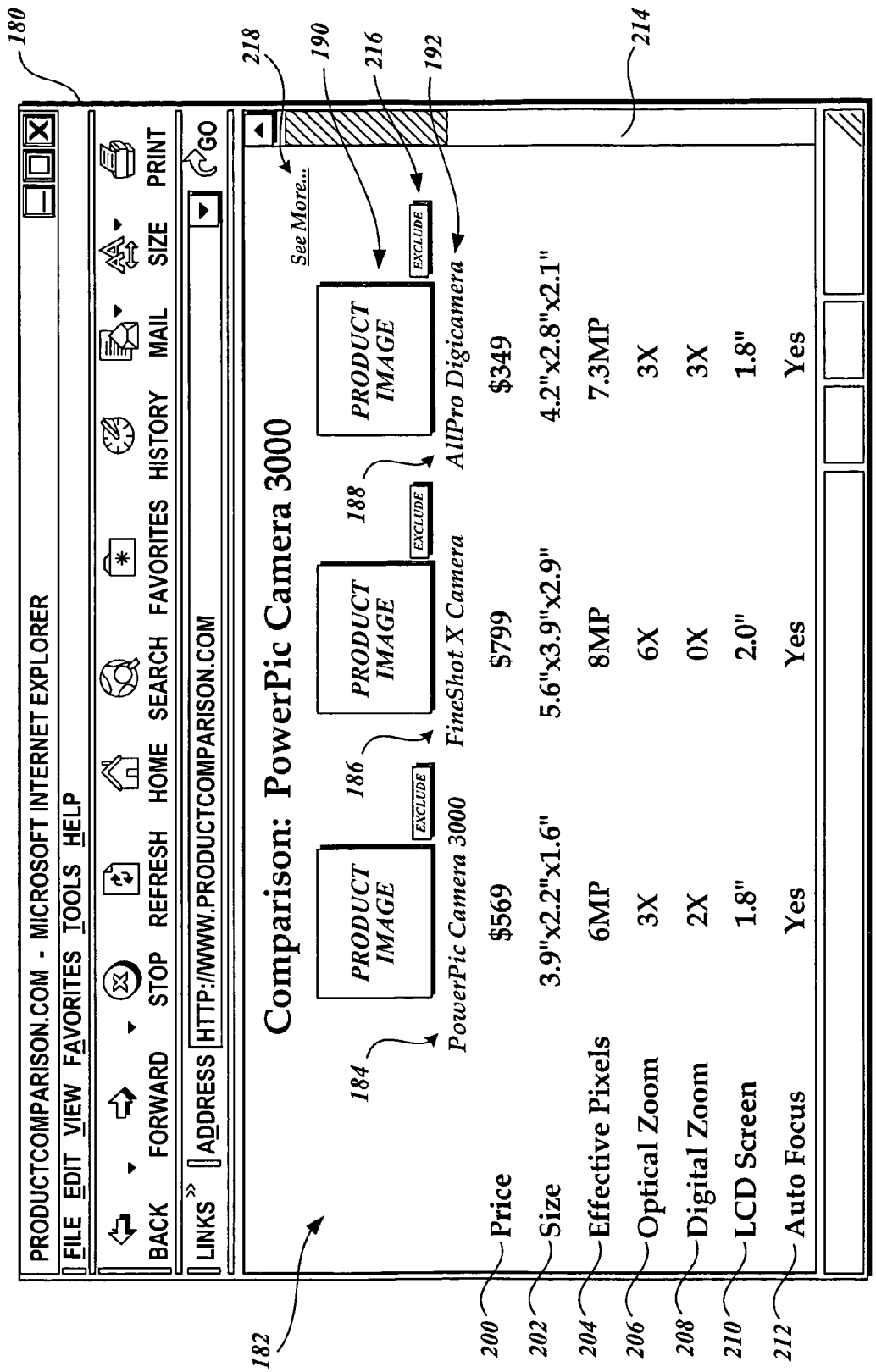
FIG. 5 illustrates an exemplary Web page depicting an item comparison that may be generated and displayed in accordance with principles of the present invention.

Before discussing the sample item comparison shown in FIG. 5, it is helpful to consider an example of a computing environment in which methods, such as method 100 shown in FIG. 1, may be implemented. FIG. 2 illustrates one exemplary computing environment 120 that includes a variety of user devices 122, 124, and 126 connected to a network 128. The network 128 may be a local area network, wide area network, or global network, such as the Internet. The user devices 122, 124, 126 are each configured to allow users operating the devices to request and receive item comparisons, as described herein, via the network 128. Although exemplary user devices such as a PC and PDA have been illustrated in FIG. 2, persons of ordinary skill in the art will recognize that any range or type of portable or non-portable device may be used. Furthermore, it will be appreciated that indicators of user activity other than positioning, movement, or clicking of a mouse pointer can be used in embodiments of the invention.

A front end server 130 shown connected to the network 128 receives an item comparison request from a user, and in turn prepares and provides an item comparison in accordance with the request. The front end server 130 may be configured to communicate with users operating the user devices 122, 124, 126 using any of a variety of communication protocols, including hypertext transfer protocol and file transfer protocol. In a Web environment, the front end server 130 may be configured with program instructions that, when executed, cause the front end server 130 to prepare and provide item comparisons in the form of Web pages that are delivered and displayed to users on the user devices 122, 124, 126.

A back end server 132 is shown operatively connected to the front end server 130. In some embodiments, the front end server 130 and the back end server 132 may be physically embodied into separate server systems, and in other embodiments, the servers 130 and 132 may be combined in a single computing apparatus. For purposes of this example, the back end server 132 is depicted separately for providing back end services to the front end server 130 for preparing and providing item comparisons to users. In the course of preparing and providing an item comparison at the instruction of the front end server 130, the back end server 132 may access, search, and analyze information contained in electronic databases, such as an item catalog 134 and a user activity database 136 stored in a memory. In this example, the item catalog 134 is assumed to include a collection of information on items, wherein each item has an associated set of attributes. The user activity database 136 is assumed, in this example, to include information concerning prior user activity with the front end server 130 and back end server 132, including browse histories and purchase histories of users.

Figure 3:
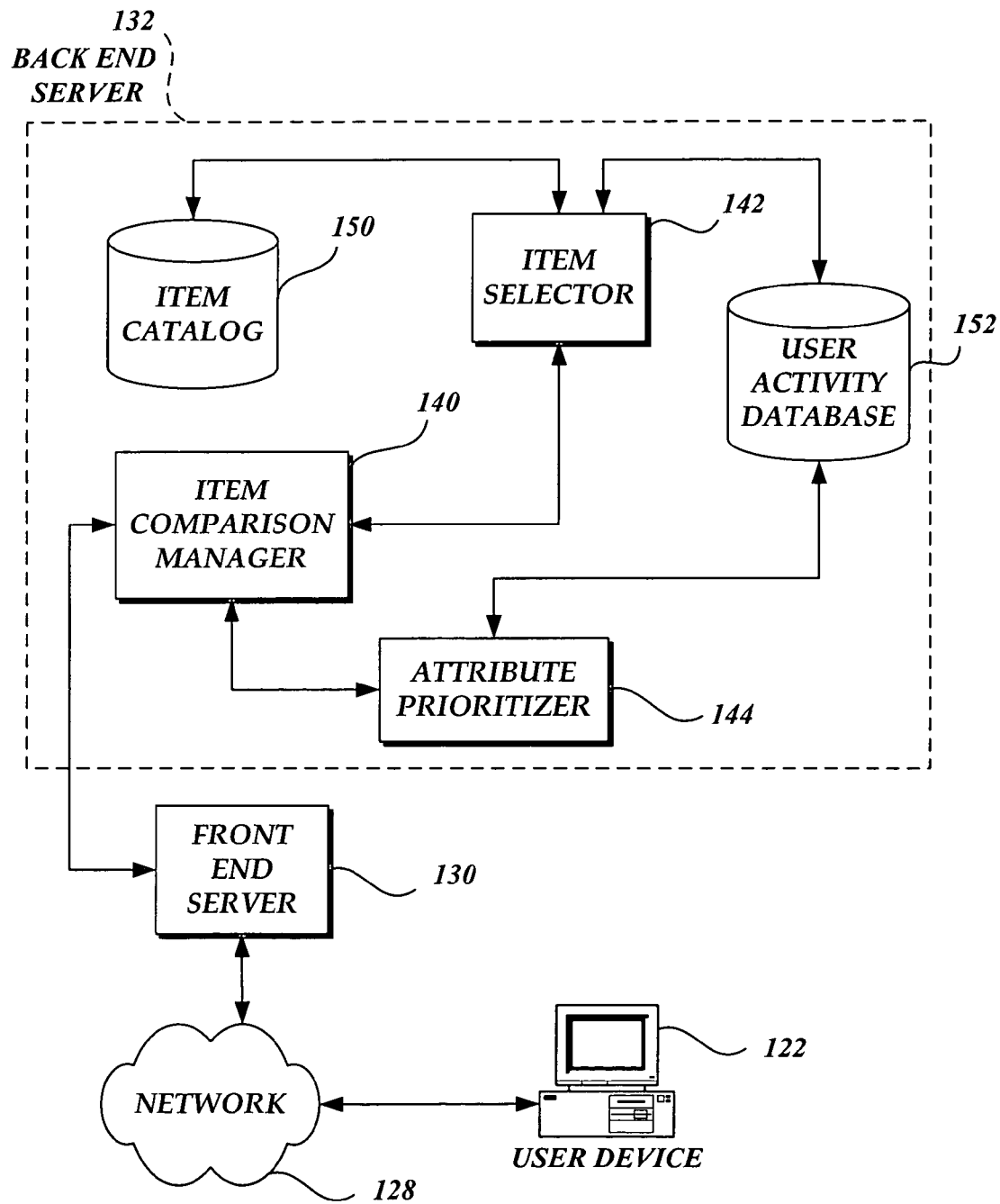
FIG. 3 is another pictorial diagram providing further details in block form regarding the environment illustrated in FIG. 2.

FIG. 3 is a pictorial diagram of the computing environment 120 shown in FIG. 2, with additional details regarding the functionality of front end server 130 and back end server 132 shown in block format. In one example of the present invention, the front end server 130 receives a request for an item comparison from the user device 122 via the network 128. The front end server 130 may simply pass the item comparison request to an item comparison manager 140 operating within the back end server 132. Alternatively, the front end server 130 may provide initial processing services that parse the item comparison request and provide appropriate instructions to the item comparison manager 140 for preparing and providing an item comparison.

The item comparison manager 140, in this example, is responsible for managing the processes in the back end server 132 for preparing the requested item comparison. In a manner as discussed above, the item comparison manager 140 may initially identify the first item to which other items are to be selected and compared. Given the identity of the first item, and possibly attributes of the first item, the item comparison manager 140 interacts with an item selector 142 to identify and select the items to be compared to the first item. The item selector 142 may generate search queries and search the item catalog 150 to identify items that are comparable to the first item.

Identifying comparable items may be accomplished in multiple steps, as described above. For example, in a first step, the item selector 142 may query the item catalog 150 to identify a candidate set of items for possible comparison to the first item. The item selector 142 then analyzes the candidate set of items to identify a comparison set of one or more items that are actually compared to the first item and provided to the user.

Also as earlier described, prior user activity with respect to the items being compared may be consulted to identify comparable items. For example, the item selector 142 may analyze browse histories or purchase histories stored in the user activity database 152 to identify and select items that are comparable to the first item in the item comparison.

Once the comparison set of one or more items is identified and selected, the item comparison manager 140 may interact with an attribute prioritizer 144 that prioritizes the attributes of the first item and the comparison items for presentation to the user. Using processes as described herein, the attribute prioritizer 144 may analyze data in the user activity database 152 to identify those attributes of the items that may be more important to users, and give greater weight to those attributes when prioritizing the attributes. As will be described below, attributes may be prioritized by programmatically measuring like attributes of the items against each other and arranging the attributes for presentation to the user in an order according to the degree the like attributes distinguish the items from each other.

Persons having ordinary skill in computer processing will recognize that the functions of the item comparison manager 140, the item selector 142, and the attribute prioritizer 144 may be implemented using any one of a variety of computer languages to code instructions that, when executed in a computing system such as the back end server 132, cause the server to carry out the intended functions.

In yet another embodiment, a computer system may be provided that includes a front end server 130, an item comparison manager 140, an item selector 142 and an attribute prioritizer 144. The front end server 130 is configured to receive a request for an item comparison. The item comparison manager 140 is configured in communication with the front end server 130 and with the item selector 142 for preparing the item comparison, wherein two or more items are identified for the item comparison. The attribute prioritizer 144 is configured to programmatically determine an order in which comparable attributes of the identified items are presented based on the attributes, such that including a different item in the item comparison can result in a different prioritized order of the attributes, as discussed below. If desired, the item comparison may be prepared and provided to a user in real time after the front end server 130 receives the item comparison request. The item comparison manager 140 and the item selector 142, together with the attribute prioritizer 144 (in some embodiments), comprise a comparison engine that is configured to prepare and provide an item comparison.

FIG. 5 illustrates one example of an item comparison that may be provided to a user in accordance with principles of the present invention. A Web browser 180 shown in FIG. 5 includes a display area showing a Web page 182. The Web page 182 features an item comparison that, in this example, may have resulted from a user actuating the "Compare" button 172 shown in FIG. 4. By user actuation of the "Compare" button 172, an item titled "PowerPic Camera 3000" is indicated as the first item for the item comparison. Accordingly, a first column 184 in the item comparison table shown in FIG. 5 includes information about the "PowerPic Camera 3000".

In this example, the automated comparison process of the invention has identified and selected two other items shown in a second column 186 and a third column 188 for comparison with the first item 184. The second item 186, in this example, is shown titled "FineShot X Camera" while the third item 188 is shown titled "AllPro Digicamera". Respective images of the items in the item comparison table may be featured at reference numeral 190 on the Web page 182. Below the item titles indicated at reference numeral 192 is a listing of like attributes shared by each of the items 184, 186, and 188. In this particular example, the attributes include price 200, size 202, effective pixels 204, optical zoom 206, digital zoom 208, LCD screen 210, and autofocus 212. The item comparison table may include many other attributes that can be seen by scrolling down the Web page 182 using the scroll bar 214 shown in FIG. 5.

As can be seen, the items in the comparison table shown in FIG. 5 are presented in a side-by-side horizontal orientation. In other embodiments, the items may be presented in a vertical orientation, perhaps with the attributes listed in columns adjacent to the items being compared. In embodiments where a first item or anchor item is identified, and then other items are identified for comparison, the comparison table may present the first item or anchor item first, followed by the other items, in a horizontal or vertical orientation.

Unlike prior art item comparisons in which attributes are presented in a static and typically unarranged or biased fashion, item comparisons provided by embodiments of the present invention include prioritized attributes that emphasize those attributes that, depending on criteria used, better serve to distinguish the items from each other. The prioritization is generally based on criteria that are more objective, and thus limits or removes bias that is found in prior art comparisons.

As previously noted, a variety of ways may be used to emphasize certain attributes over others. For example, in some embodiments, attributes in an item comparison are shown arranged in an order according to the degree the attributes distinguish the items from each other. In the example of FIG. 5, attributes such as price 200, size 202, and effective pixels 204, have been arranged to appear higher in the list than other attributes in the item comparison because those attributes are determined to distinguish the items 184, 186, 188 from each other more than the other attributes.

Any of a variety of algorithms may be used to measure like attributes of items against each other for purposes of determining the degree that the attributes tend to distinguish the items from each other. In one suitable algorithm, a numerical analysis of the attributes is performed by assessing a distance between the attributes. The distances may be used to provide scores for comparison. If desired, the distance assessments may be normalized. There are many distance-measuring functions and algorithms known in the art, especially in clustering literature, that may be used in this aspect of the invention. Persons having ordinary skill in the art will recognize suitable functions and algorithms that may use entropy criteria, information gain, gain ratios, gini index, KL distances, and/or J measures. Embodiments of the invention can also use methods for attribute selection, e.g., as used in decision trees. Attributes that are not already in numeric form may have numeric values assigned to them, if desired (e.g., attributes in "Yes/No" form may have a value of 1 assigned to "Yes" attributes, and a value of 0 assigned to "No" attributes).

One exemplary illustration of a process for determining normalized distances between attributes, and forming scores therefrom, is described as follows. Items in a certain range of items, such as items identified in a candidate set of items as previously described, may be analyzed to determine a range of values that an attribute of the items may cover. For example, a candidate set of digital camera items for possible comparison with the "PowerPic Camera 3000" 184 shown in FIG. 5 may include prices that range from $349 to $799.

Each range of attributes may be normalized to a score of 0-100, for example. Item prices in the range of $349 to $799 may thus be assigned a score according to the distance of the prices from each other within the price range.

In this example, the "AllPro Digicamera" 188, having a price of $349 that matches the low end of the price range, receives a score of 0 for its price attribute. The price attribute for the "FineShot X Camera" 186, matching the high end of the price range at $799, receives a score of 100 for its price attribute. The "PowerPic Camera 3000" 184, having a price attribute of $569, receives a score of 48 for its price attribute. The score of 48 is calculated, in this example, by subtracting the low end of the price range ($349) from the $569 price of the camera 184. The result of the subtraction is then divided by the distance of the entire range, that is the value of $799 (the high end of the range) minus $349 (the low end of the range). The result of this division is then multiplied by 100. Stated otherwise for this example, [($569−$349)/($799−$349)]×100=48.

In a like manner, normalized distances may be calculated for other attributes to form similar scores in a range of 0-100 for each of the attributes. For example, turning to the effective pixels attribute 204, it may be that the digital cameras in the candidate set of items (from which the compared items 186 and 188 were selected) cover a range of 4 megapixels to 8 megapixels (MP). Using a calculation as described above for the price attribute 200, the effective pixels attribute 204 for the first item 184 (that is, 6 MP) receives a score of 50, while the effective pixels attribute for the second item 186 (8 MP) and the third item 188 (7.3 MP) receive scores of 100 and 82.5, respectively. As to the latter score for the third item 188, for example, the score is calculated as follows: [(7.3 MP−4 MP)/(8 MP−4 MP)]×100=82.5.

For attributes such as size 202, a numeric value for the attribute may be determined based on the cubic size of the item, that is, the product of the width, height and depth dimensions provided by the size attribute of the items. In this particular example, the first item 184 has a cubic size of 13.728, the second item 186 has a cubic size of 63.336, and the third item 188 has a cubic size of 24.696. Using those cubic values in a calculation as described above, given a cubic size of items in the candidate set of items for this comparison ranging from 10 to 70 (for example), a score of 6.2 is calculated for the first item 184, while scores of 88.9 and 24.5 are calculated for the second item 186 and third item 188, respectively.

Turning to the remaining attributes in the item comparison of FIG. 5, applying a similar calculation as described above, and given example attribute ranges of 3X-8X for the optical zoom attribute 206, 0X-4X for the digital zoom attribute 208, 1.8"-2.2" for the LCD screen attribute 210, and 0-1 for the autofocus attribute 212 (0 signifying "No" and 1 signifying "Yes"), scores for the remaining attributes may be calculated as follows: 0, 60, 0, respectively, for the optical zoom attribute 206 of the first item 184, second item 186, and third item 188; 50, 0, 75, respectively, for the digital zoom attribute 208 of the items 184, 186, 188; 0, 50, 0, respectively, for the LCD screen attribute 210 of the items 184, 186, 188; and 100, 100, 100, respectively, for the autofocus attribute 212 of the items 184, 186, 188.

With scores that are indicative of a normalized distance between the attributes of the items in the item comparison, which may be calculated by methods described above or other methods, a meaningful comparison of like attributes for prioritization of the attributes can be performed. In one basic embodiment, for each like attribute of the items 184, 186, 188, the attributes are prioritized based on the difference between the scores of the second and third items 186, 188 from the first item 184. Those attributes having a greater difference in scores compared to the first item 184 are considered in this example to be better able to distinguish the items from each other.

In the example of FIG. 5, the price score of 100 assigned to the second item 186 and the price score of 0 assigned to the third item 188 collectively have a greater difference from the price score 48 assigned to the first item 184 than the difference in scores of the other attributes in the item comparison. Accordingly, the price attribute 200 is arranged highest in the order of attributes in the item comparison Web page 182. The user receiving the item comparison will consider that attribute first.

The size attribute 202 is arranged next in the order of attributes in the item comparison because the collective difference between the size attribute scores assigned to the second item 186 (that is, 88.9) and the third item 188 (that is, 24.5) from the score of the first item 184 (that is, 6.2) is greater than the collective difference of the scores of the attributes below it. This arranging of attributes in an order according to the degree the attributes distinguish the items from each other may continue until the item comparison reaches attributes having identical scores, such as the autofocus attribute 212. Attributes having identical scores are generally considered to have the least ability to distinguish the items from each other, and thus are arranged lower in the order of attributes.

The ordering of attributes in an item comparison provided to a user may be adjusted by assigning weights to the attributes such that attributes having greater weight will have greater influence on the ordering the attributes than attributes having lesser weight. In that regard, for example, for digital cameras it may be recognized that users consider the effective pixels attribute 204 to be more important than other attributes, regardless of the ability of that attribute to distinguish the compared items. With appropriate weighting of the scores assigned to the effective pixels attribute for the items 184, 186, 188, the effective pixels attribute 204 may appear higher in the list of attributes even though the collective difference between the scores of the compared items 186, 188, from the first item 184 may be lower than that of other attributes. In some cases, the effective pixels attribute 204 may have the same attribute value for each of the items 184, 186, 188, yet with appropriate weighting, the effective pixels attribute 204 may appear higher in the list of attributes in the item comparison. Weights may be assigned to attributes in the form of numerical values or other ordered indicators of importance.

For purposes of weighting attributes, the relative importance or value of item attributes may, in some embodiments, be determined by analyzing data that reflects prior user activity with items of the type shown in the item comparison, or other data such as item reviews, sales ranking, item description pages, etc., which may be stored in one or more local or remote repositories. Attributes tending to be more popular with users or subject to more frequent searching, for example, may be considered more important or valuable to users and hence eligible for greater weighting when the item attributes are prioritized at block 108 (FIG. 1). Weights may be assigned to attributes manually or automatically in accordance with embodiments of the invention.

It should also be recognized that the attributes identified in FIG. 5 are exemplary only. Numerous other attributes may be shown. Furthermore, other types of items will have different attributes associated therewith that may form part of an item comparison produced in accordance with the present invention. In addition, other attributes such as attributes related to user behavior or commercial success of an item, may be shown. For example, an item comparison (e.g., as shown in FIG. 5) may include "People Who Viewed This Item Actually Purchased It" followed by numbers such as "72%", "10%", and "92%" respectively under each of the columns for the items 184, 186, 188. As another example, an item comparison may include "Sales Rank" (among comparable items) followed by numbers such as "1", "4", and "2" respectively under each of the columns for the items 184, 186, 188. The item comparison may also combine attributes that are all shared by the compared items such as by indicating "All have . . . Carrying case: Yes; Strap: Yes; Shutter Speed Range: 30 sec to 1/1000 sec; Interchangeable Lenses: No".

Returning now to FIG. 1, after the attributes of the first item 184 and the comparison set of items 186, 188 have been prioritized (block 108), the item comparison with the prioritized attributes is provided to the user, as indicated at block 110. The item comparison may be provided to the user in any format, such as a Web page (e.g., Web page 182 shown in FIG. 5), word processing document, spreadsheet document, etc.

The method 100 in FIG. 1 depicts an additional, optional step in which feedback regarding the item comparison is received from the user, as indicated at block 112. Such feedback from the user may be a simple response indicating whether the item comparison was useful, or it may be a type of response that causes the method 100 to prepare and provide a modified item comparison to the user. In regard to the latter, for example, the user may click on and thereby designate another item to be the first item 184 (see FIG. 5) with which other items 186, 188 are compared. In that case, the method 100 takes the newly-designated first item 184 and automatically returns to block 106 to identify a set of other items 186, 188 for comparison with the newly-designated first item 184. Automated processes for preparing and providing an item comparison based on the newly-designated first item 184 may proceed as earlier described in regard to blocks 106, 108, and 110.

In other circumstances, the feedback received at block 112 from the user may indicate an attribute of interest to the user. For example, the user may click on or otherwise indicate an attribute of interest in the item comparison Web page 182 provided to the user. Referring to FIG. 5, for instance, a user may click on or hover over the optical zoom attribute 206. The method 100 may then designate the optical zoom attribute 206 as an attribute of interest. Such action may result in weighting the attribute, and then re-generating a new item comparison in which the comparison set of other items 186, 188, is modified to include items that are most similar to the first item 184 with respect to the optical zoom attribute 206. In this example, where the first item 184 has an optical zoom attribute of "3X", a modified item comparison may be generated in which the comparison items 186, 188 items have the same or similar optical zoom attribute.

In yet other circumstances, the feedback received from the user at block 112 may indicate an attribute of interest, after which the item comparison provided to the user is modified to emphasize the attribute of interest. As described earlier, emphasis of an attribute may be accomplished by weighting the attribute so that it appears higher in the order of attributes. In yet other embodiments, an attribute of interest may be emphasized by some other designation, such as bolding the text of the attribute, or placing an icon or image next to the attribute, etc.

Figure 6:
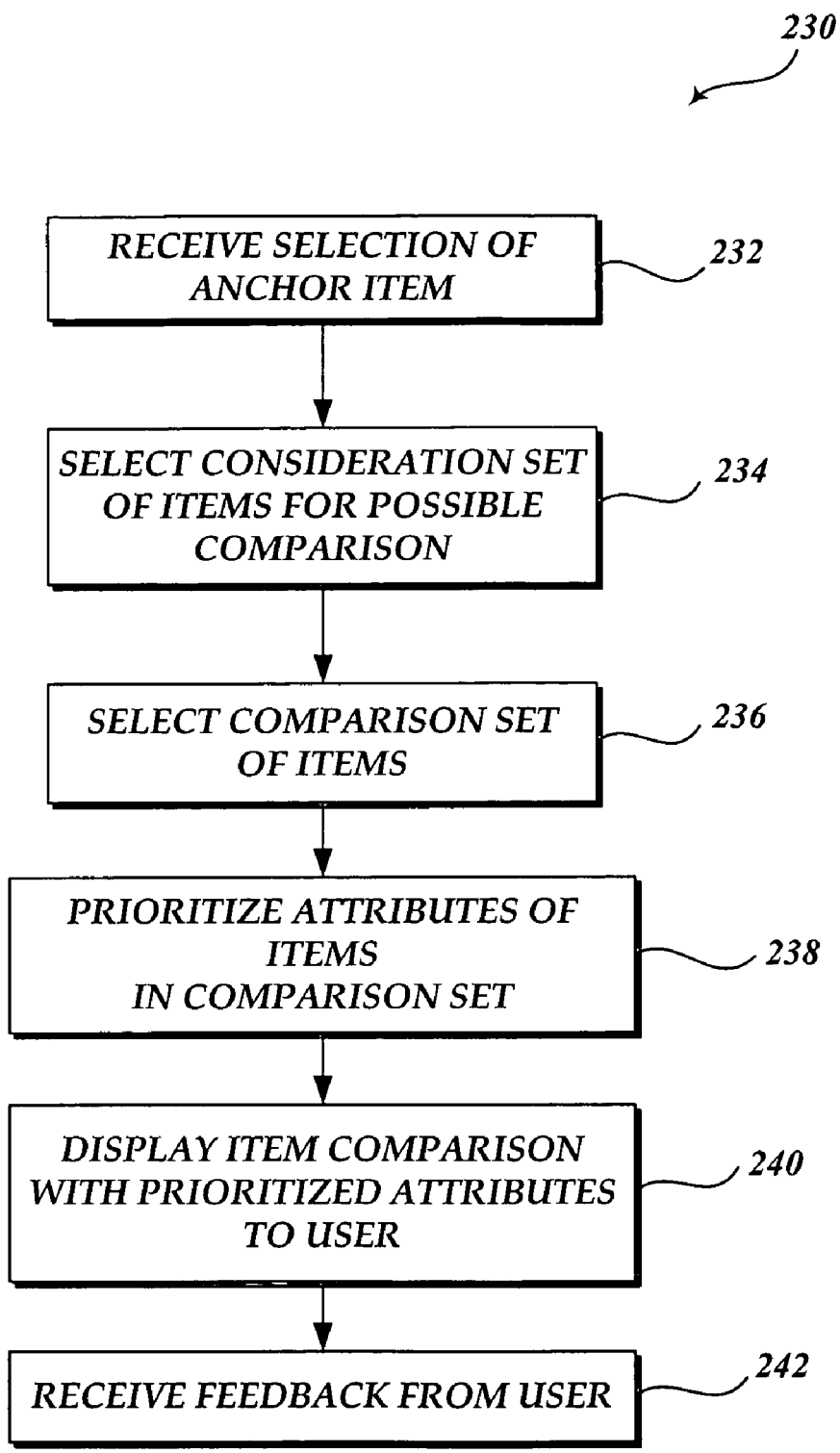
FIG. 6 is a flow diagram illustrating another exemplary embodiment of a method for automated comparison of items conducted in accordance with the present invention.

While several embodiments of the invention have been illustrated and described above, it will be appreciated that various changes can be made therein without departing from the spirit and scope of the invention. For example, FIG. 6 depicts yet another method 230 that may be performed by a computer system in accordance with the present invention. The method 230 incorporates many steps as previously described. Briefly stated, the method 230 begins at block 232 by receiving a selection of a first item that, in this embodiment, is designated as an anchor item for the item comparison. An anchor item generally remains in the item comparison, even though other items in the item comparison may be moved or replaced, e.g., according to user feedback such as by clicking on an attribute of interest. An anchor item generally remains in the item comparison until replaced by another anchor item. In one exemplary embodiment, the user may click on one of the other items featured in the item comparison (other than the anchor item) to designate a new anchor item.

In some embodiments, an anchor item may be selected based on an anchor descriptor that identifies a set or category of items from which the anchor item is selected. The anchor descriptor may be static or dynamic in how it is defined. While in these embodiments the anchor descriptor generally remains constant until replaced by another anchor descriptor, the actual anchor item selected for the item comparison may change from one item comparison to the next.

At block 234, the method 230 selects a candidate set of items for possible comparison to the anchor item, after which a comparison set of items is selected in block 236 for actual comparison to the anchor item. As previously described in regard to block 106, an algorithm for determining comparable items that casts a wider net may be used in block 234 to select the candidate set of items, and another algorithm may be applied in block 236 to the candidate set of items to narrow down and select the comparison set of items.

Once the comparison set of items is selected in block 236, the attributes for the anchor item and the comparison set of items are prioritized in block 238, after which the item comparison with the prioritized attributes is provided to the user in block 240. As with the method 100 shown in FIG. 1, the method 230 shown in FIG. 6 may optionally receive feedback from the user in block 242. Such feedback may cause the method 230 to repeat actions discussed above in blocks 232-240 to prepare and provide modified item comparisons to the user based on the feedback received.

According to some embodiments of the present invention, a user is not required to identify competing items for a comparison prior to requesting an item comparison. With the actuation of a single control, such as clicking on a "Compare" button shown in FIG. 4, or other single user action, an automated process may generate, typically in real time, a comparison of comparable items and provide the item comparison to the user. A single-click "Compare" button could appear, by way of illustration, on an item detail Web page, on a search results page with a listing of items, on a popup window that may appear when the user's cursor hovers over an item description, with a list of items provided to the user for other reasons, etc. If the user decides that he or she wishes to see other items in the item comparison, the user may provide feedback, e.g., by clicking on an attribute of interest, that causes a modified item comparison to be prepared and provided to the user. The item comparison Web page 182 provided to the user in FIG. 5 may also include controls for each of the items, such as the "Exclude" buttons 216, which the user may actuate to replace one or more of the depicted items from the item comparison. If the user clicks on the "Exclude" button 216 for an anchor item 184, one of the other items 186, 188 in the item comparison may automatically be designated as a new anchor item for the comparison. Alternatively, a completely different item may be designated as the new anchor item. The excluded item is then removed from the item comparison Web page 182 and a new item comparison with different compared items is generated and provided to the user.

In yet another embodiment of the invention, a user clicking on an attribute (or hovering a mouse pointer over an attribute for a determined period of time), may receive additional information explaining why the attribute may be considered important. Such additional information may appear in a popup window or other interface displayed to the user. This additional information may include a histogram illustrating a distribution of items considered in the item comparison across the range of values for the particular attribute. In that manner, the user may observe whether the items shown in the comparison have an attribute that is unique to the items or is shared with a large number of other items. This additional information may be provided to the user as an interstitial step before continuing to modify the item comparison with an emphasis on the attribute of interest. A separate control, such as a button, may be provided for the user to actuate to continue with the modified item comparison. Alternatively, the modified comparison may be provided automatically after a period time has elapsed.

In still another embodiment of the invention, a user may be presented with an interface that allows the user to select the algorithms or parameters thereof used to produce the item comparison. Typically, such an interface would be provided only to users indicating an advanced ability to configure the item comparison process. Some algorithms for selecting comparable items may cast a wider net, as previously described, while other algorithms may be tuned for selecting items having attributes in certain ranges. An interface, such as a drop down box, may enable a user to indicate an algorithm of interest. Separate drop down boxes may be provided, for example, for each of the processes that selects a candidate set of items for possible comparison, selects a comparison set of items for actual comparison, and prioritizes attributes of the comparison set for the item comparison.

Further embodiments of the invention may be constructed to address circumstances in which a user desires to compare two or more specific items. Although prior art approaches such as providing check boxes associated with the items of interest may be used to designate the items for comparison, automated item comparison processes of the invention may consider the other actions of a user to identify the items the user desires to compare.

For example, a circumstance may occur in which a user clicks on a "Compare" button for item A, and while item B may be included in the candidate set of items for possible comparison with item A, it is not included in the smaller set of comparison items actually compared to item A. Suppose then the user continues to browse the items and sees item B with an associated "Compare" button. If the user clicks on the "Compare" button for item B, an automated item comparison process may assume that the user is interested in both items A and B. The process thereafter ensures that item A is included in the comparison set of items actually compared with item B.

In another circumstance, a user may browse information regarding item A and later click on a "Compare" button associated with item B. Again, an automated item comparison process could assume that the user is interested in both items A and B, and thereafter ensure that item A is included in the comparison set of items actually compared with item B. The amount of time taken and/or the number of pages viewed to browse information regarding item A may be relevant in this regard.

An item comparison Web page 182 may include a further control, such as a "See More" link 218 shown in FIG. 5, that provides greater control over the items shown in the item comparison. For instance actuating the See More link 218 may cause an interface to appear to the user showing some or all of the items in the candidate set of items selected for possible comparison. By associating appropriate controls, such as check boxes, with the list of items shown to the user, the user may designate one or more particular items to be added or substituted in the item comparison Web page 182.

As an alternative, the "Exclude" buttons 216 shown in FIG. 5 may be configured to not only remove the item associated with the particular Exclude button that was clicked on, but also provide the user an interface listing the items in the candidate set of items that allows the user to designate a particular item to replace the item being excluded (or possibly designate other candidate items to be sure are excluded). The item comparison Web page 182 would then be prepared with the substituted item shown in the item comparison. Prioritizing of the attributes shown in the Web page 182 may be performed after substituting a new item in the item comparison.

As described earlier, the first item 184 may be designated an anchor item that remains in the item comparison Web page 182 until a new anchor item is designated. An additional feature may be added to embodiments of the invention in which each of the items 184, 186, 188, for example, have a lock icon or other control that a user may actuate to indicated that a certain item should be locked into the item comparison table. In this manner, while the first item 184 may remain an anchor item to which the other items 186, 188 are compared, one or more of the other items 186, 188 may be locked into the table so that when a modified item comparison is run, only the unlocked item(s) may be replaced with other comparable item(s).

In still other embodiments, an item comparison may automatically be generated and provided to a user without receiving a user request for the comparison. A user interface or algorithm observing a user's activity may programmatically identify circumstances in which an item comparison would appear to be helpful or desired by a user and automatically proceed to provide the comparison.

It should also be recognized that the present invention includes embodiments in the form of a computer-accessible medium having contents that cause a computer system to undertake actions described herein. For instance, one embodiment of a computer-accessible medium may cause a computer system to receive a request for an item comparison and prepare the item comparison by identifying a first item for the item comparison, identifying a set of one or more other items for comparison with the first item, and programmatically determining an order of attributes of the first item and the other items in the comparison set based on the attributes, such that including a different item in the comparison set can result in a different prioritized order of the attributes. The item comparison is then provided to a user with the prioritized order of attributes. If desired, the contents of the computer-accessible medium may cause the computer system to prepare and provide the item comparison to a user in real time after receiving the item comparison request.

Figure 7:
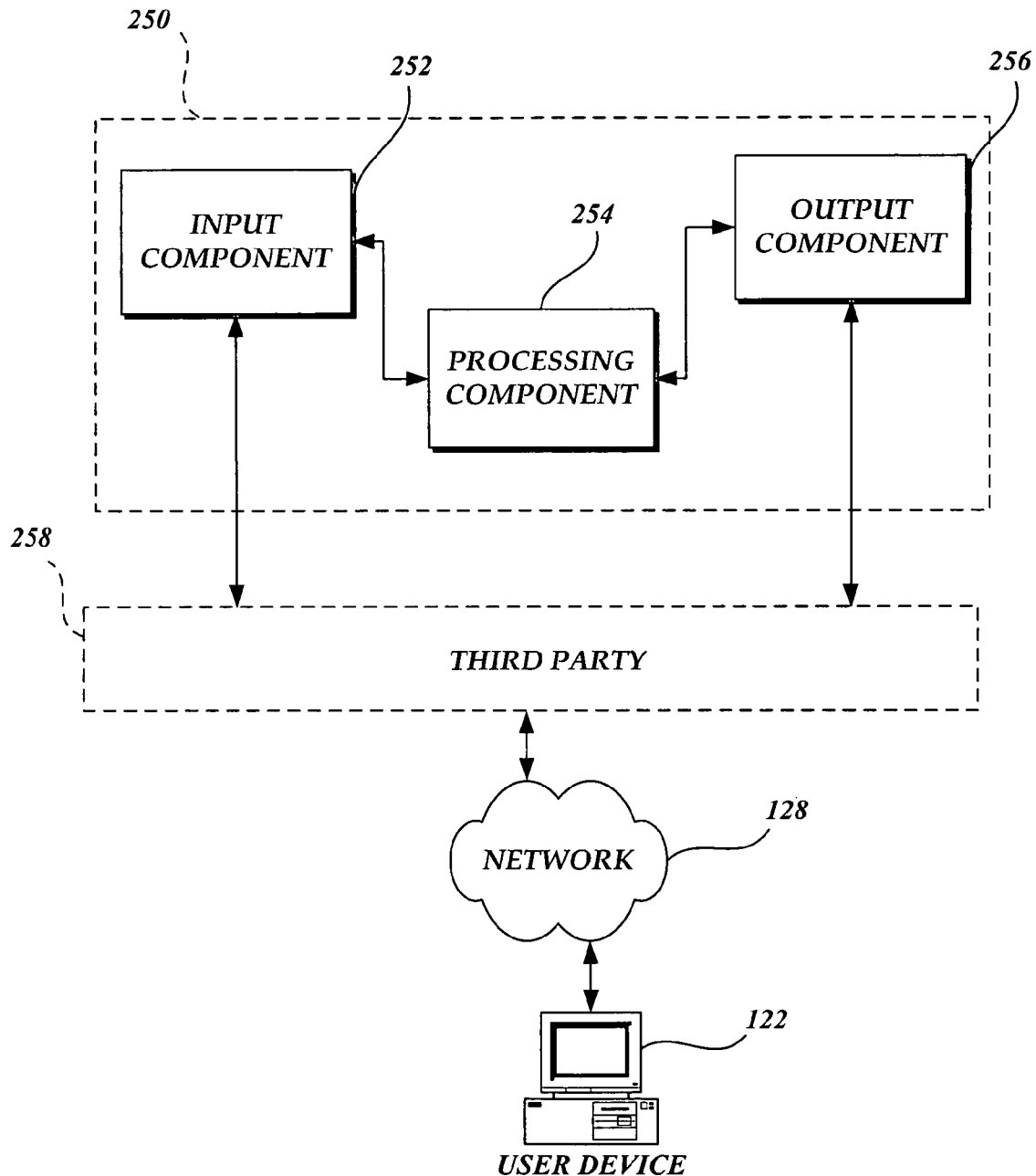
FIG. 7 is block diagram of an interface that may be provided in accordance with the present invention.

FIG. 7 is block diagram of one exemplary interface 250 that may be used to provide an automated comparison of items in accordance with the present invention. The illustrated interface 250 includes an input component 252, a processing component 254, and an output component 256. The input component 252 is configured to receive information representing an action by a user, such as a user operating a user device 122 in connection with network 128. In response to information received by the input component 252 that represents a single user action, the processing component 254 may produce a comparison of items with a first item by identifying a comparison set of one or more other items for comparison with the first item and programmatically determining an order of attributes of the first item and the other items in the comparison set in a manner described or suggested above in regard to FIGS. 1-6. The attributes are prioritized based on an analysis of the attributes, such that including a different item in the comparison set can result in a different prioritized order of the attributes. The output component 256 is configured to provide the item comparison produced by the processing component 254. If desired, the components of the interface 250 illustrated in FIG. 7 may incorporate some or all of the hardware and software features of the front end server 130 and backend server 132 discussed above with respect to FIGS. 2 and 3.

In some embodiments, the input component 252 may be accessible via an application programming interface (API) that enables a third party 258 in communication with a user device 122 to access the input component and provide information representing an action by the user. Alternatively, or in addition, the output component 256 may be accessible via an API that enables a third party 258 in communication with the user device 122 to access the output component 256 and receive the item comparison. As with the comparison table illustrated in FIG. 5, the output component 256 may provide an item comparison in which the items in the comparison are identified side-by-side with their attributes presented in a prioritized order.

In operation, the input component 252 may receive information representing user actuation of a mechanism (e.g., a single user action) that initiates an automated comparison of items in accordance with embodiments of the invention. The item comparison may be produced without requiring the user to identify all of the items in the item comparison. Examples of a mechanism that may be used in this regard, without limitation, include a button and a link that a user may actuate for an automated item comparison. A non-limiting example is illustrated by the "Compare" buttons 168, 170, 172, 174 shown in FIG. 4.

The processing component 254 of the interface 250 may further be configured to produce a modified item comparison, particularly in response to feedback from a user device 122.

For example, information representing a single user action may indicate user interest in an attribute of the items in the item comparison. In response thereto, the processing component 254 may produce a modified item comparison that emphasizes the attribute of interest. Alternatively, or in addition, the processing component 254 may be configured to produce a modified item comparison when a user, by way of information representing a single user action, indicates user interest in an item in the comparison set. In that regard, the item of interest may becomes the first item for the item comparison and thereafter the processing component 254 identifies a new comparison set of one or more other items for comparison with the first item. The processing component 254 also determines a new order of attributes based on an analysis of the attributes of the items in the modified item comparison.

From a user perspective, an embodiment of the invention may implement a method for an item comparison that includes, from a client device, providing to a comparison engine an identification of a first item. In response to a single action of a user of the client device, a signal may be provided to the comparison engine to prepare an item comparison based on the first item. The client device thereafter receives from the comparison engine a comparison of a set of items that includes the first item and one or more other items. The comparison includes the items in the set and a prioritized order of attributes of the items in the set.

The comparison engine is configured to programmatically select the one or more other items in the set and the prioritized order of comparison attributes in response to the signal. If desired, the item comparison may be initiated without requiring the user to acknowledge a criterion used by the comparison engine to programmatically select the one or more other items for the item comparison.

In response to a further single action of the user indicating an attribute of interest, the method may further comprise providing to the comparison engine a signal to prepare a modified item comparison. The modified item comparison may include one or more other items programmatically selected by the comparison engine based on at least the attribute of interest.

In yet another embodiment, a method for an item comparison may include identifying a first item for an item comparison and, using multiple criteria, programmatically selecting a comparison set of one or more other items for comparison with the first item. The item comparison may be produced for output to a user without prior user acknowledgement of the criteria used to identify the one or more other items in the item comparison. Programmatic selection of items using criteria not acknowledged in advance by the user allows the criteria to differ from one item to another and from one item comparison to another. Moreover, the criteria to be used may be automatically chosen before or after the item comparison is initiated.

In some cases, the first item in the item comparison may be identified by a user. In other cases, the first item may be automatically identified from a type of item indicated by user activity.

As noted above, multiple criteria may be used to programmatically select the one or more other items for comparison with the first item. The multiple criteria may include, but are not limited to: a criterion that selects items based on data reflecting user activity in regard to the items; a criterion that selects items based on a sales ranking of the items; a criterion that selects items based on a search of pages for reference to the first item and for reference to other items in relation to the first item; and a criterion that selects items based on item attributes that collectively are most similar to attributes of the first item. In regard to the latter criterion, the attributes may be weighted such that attributes having a greater weight will have greater influence for selection of the items than attributes having lesser weight.

As to a criterion that selects items based on data reflecting user activity, the data may include, but are not limited to: a browse history comprised of a record of items viewed by one or more users who also viewed the first item; a purchase history comprised of a record of items purchased by one or more users who previously viewed the first item; and a purchase history comprised of a record of items viewed by one or more users who previously purchased the first item. In some cases, where desired, the data reflecting user activity may be limited to user activity in regard to items identified as belonging to a same category of items to which the first item belongs.

As with other embodiments described herein, the foregoing method may further comprise measuring like attributes of the items in the comparison set against each other and arranging the attributes for presentation to a user in an order according to a degree that the like attributes distinguish the items from each other. Alternatively or additionally, the method may further comprise analyzing data that reflects prior user activity to determine user interest in an attribute of an item, and thereafter produce the item comparison in which an attribute determined to be of greater interest is emphasized. In some cases, the attribute of greater user interest may be emphasized in the item comparison by arranging the attribute to appear higher in an order of the attributes. Furthermore, as with other embodiments described herein, the items in the comparison set may be selected in real time after receiving a request for the item comparison. In the foregoing specification, the invention has been described with reference to various specific embodiments thereof. However, modifications and changes to those embodiments and others can be made without departing from the broader spirit and scope of the invention. The specification and drawings are, accordingly, to be regarded in an illustrative rather than restrictive sense. The scope of the invention should be determined from the following claims and equivalents thereto.

What is claimed is:

1. A computer-implemented method for an automated comparison of items, comprising:
    (a) identifying, by a server, a first item for an item comparison;
    (b) identifying, by a server, a comparison set of one or more other items for comparison with the first item;
    (c) programmatically determining, by a server, an order of attributes of the first item and the other items in the comparison set in which the attributes are prioritized based on an analysis of the attributes, such that including a different item in the comparison set can result in a different prioritized order of the attributes, wherein the prioritized order is based on a calculation of dissimilarity between attributes of the first item and attributes of the other items in the comparison set; and
    (d) producing the item comparison in which the item attributes are configured for presentation in the prioritized order to a user device.

2. The method of claim 1, wherein the first item is identified by a user.

3. The method of claim 1, wherein the first item is automatically identified from a type of item indicated by user activity.

4. The method of claim 3, wherein the user activity is user interaction with a Web page.

5. The method of claim 3, wherein the user activity is user interaction with an electronic catalog of items offered by a merchant.

6. The method of claim 1, wherein the first item is designated as an anchor item that remains in the item comparison until another item is designated as the anchor item.

7. The method of claim 1, wherein the comparison set of one or more other items is automatically identified based on data reflecting user activity in regard to the items.

8. The method of claim 7, wherein the data reflecting user activity includes a browse history comprising a record of one or more other items viewed by one or more users who also viewed the first item.

9. The method of claim 7, wherein the data reflecting user activity includes a purchase history comprising a record of one or more other items purchased by one or more users who previously viewed the first item.

10. The method of claim 7, wherein the data reflecting user activity includes a purchase history comprising a record of one or more other items viewed by one or more users who previously purchased the first item.

11. The method of claim 7, wherein the first item belongs to a category and the data reflecting user activity is limited to user activity in regard to items identified as belonging to the same category of items to which the first item belongs.

12. The method of claim 1, wherein the first item and one or more other items for comparison with the first item are identified by a user.

13. The method of claim 1, wherein the set of one or more other items identified for comparison is identified by analyzing attributes of the first item and selecting one or more other items that share like attributes with the first item.

14. The method of claim 1, wherein the set of one or more other items identified for comparison is identified by searching pages having recognized text in said pages for reference to the first item and then identifying other items referenced in relation to the first item.

15. The method of claim 14, wherein the pages are images of printed pages, and the text in said page images has been recognized by a character recognition process applied to the page images.

16. The method of claim 1, wherein the set of one or more other items identified for comparison is identified by searching pages available at multiple sites on a computer network for reference to the first item and then identifying other items referenced in relation to the first item.

17. The method of claim 1, wherein identifying the set of one or more other items for comparison with the first item comprises:
   (1) selecting a candidate set of items for possible comparison with the first item; and
   (2) selecting one or more items from the candidate set for comparison with the first item.

18. The method of claim 17, wherein the items in the candidate set of items are selected based on measuring like attributes of the items and selecting those items having attributes that collectively are more similar to the attributes of the first item than the attributes of other items.

19. The method of claim 18, wherein the attributes are weighted such that attributes having a greater weight have greater influence for selection of the items than attributes having lesser weight.

20. The method of claim 18, wherein the one or more items from the candidate set that are selected for comparison with the first item are selected for having attributes that collectively are most similar to the attributes of the first item.

21. The method of claim 20, wherein the attributes are weighted such that attributes having a greater weight have greater influence for selection of the items than attributes having lesser weight.

22. The method of claim 1, wherein prioritizing the attributes of the first item and the other items in the comparison set comprises measuring like attributes of the items against each other and arranging the attributes in an order according to a degree that the like attributes distinguish the items from each other.

23. The method of claim 1, wherein the attributes are weighted such that attributes having a greater weight have greater influence on ordering the attributes than attributes having lesser weight.

24. The method of claim 1, further comprising receiving feedback from a user regarding an aspect of the item comparison and providing a modified item comparison in accordance with the user feedback.

25. The method of claim 24, wherein the feedback includes a user action resulting in designation of another item to be the first item with which other items are compared, the method further comprising preparing and providing a modified item comparison based on the newly-designated first item.

26. The method of claim 24, wherein the feedback includes a user indication of an attribute of interest, the method further comprising preparing and providing a modified item comparison in which the comparison set includes items that are most similar to the first item with respect to the attribute of interest.

27. The method of claim 24, wherein the feedback includes a user indication of an attribute of interest, and wherein the item comparison provided to the user is modified to emphasize the attribute of interest.

28. The method of claim 27, wherein the attribute of interest is emphasized by rearranging the attributes in an order where the attribute of interest is shown higher in the order of attributes.

29. The method of claim 1, wherein prioritizing the attributes of the first item and the other items in the comparison set comprises analyzing data reflecting prior user activity to determine user interest in an attribute, and wherein preparing the item comparison includes emphasizing an attribute determined to be of greater interest than another attribute in the item comparison.

30. The method of claim 29, wherein an attribute of greater user interest is emphasized in the item comparison by arranging the attribute higher in an order of the attributes.

31. The method of claim 29, wherein prioritizing the attributes further comprises measuring like attributes of the items and arranging the attributes in an order according to an emphasis based on like attributes that distinguish the items from each other and attributes of greater user interest.

32. The method of claim 1, wherein the item comparison is prepared in real time after receiving a request for an item comparison.

33. A computer-implemented method for an automated comparison of items, comprising:
   (a) obtaining, from a user device, a designation of an anchor item;
   (b) selecting, by a server, a candidate set of items for possible comparison with the anchor item;
   (c) selecting, by the server, a comparison set of items from the candidate set of items for comparison with the anchor item;
   (d) programmatically determining by the server, an order of attributes of the anchor item and the items in the comparison set in which the attributes are prioritized based on an analysis of the attributes, such that including a different item in the comparison set can result in a different prioritized order of the attributes, wherein the prioritized order is based on a calculation of dissimilarity between attributes of the anchor item and attributes of the items in the comparison set; and (e) producing, for display on a display device, a comparison of the anchor item and the items in the comparison set in which the item attributes are configured for presentation in the prioritized order.

34. The method of claim 33, wherein the candidate set of items is selected from an electronic catalog of items.

35. The method of claim 33, wherein the candidate set of items is selected based on data reflecting prior user activity in regard to the items.

36. The method of claim 35, wherein the data reflecting prior user activity is a browse history comprising a record of one or more items viewed by one or more users who also viewed the anchor item.

37. The method of claim 35, wherein the data reflecting prior user activity is a purchase history comprising a record of one or more items purchased by one or more users who previously viewed the anchor item.

38. The method of claim 35, wherein the data reflecting prior user activity is a purchase history comprising a record of one or more items viewed by one or more users who previously purchased the anchor item.

39. The method of claim 35, wherein the anchor item belongs to a category and the data reflecting prior user activity is limited to user activity in regard to items identified as belonging to the same category of items as the anchor item.

40. The method of claim 35, wherein the candidate set of items is selected by analyzing attributes associated with the anchor item and selecting one or more other items that share like attributes with the anchor item.

41. The method of claim 33, wherein the candidate set of items is selected by searching pages having recognized text in said pages for reference to the anchor item and then identifying other items referenced in relation to the anchor item.

42. The method of claim 41, wherein the pages are images of printed pages and the text in said page images has been recognized by a character recognition process applied to the page images.

43. The method of claim 33, wherein the candidate set of items is identified by searching pages available at multiple sites on a computer network for reference to the anchor item, and then identifying other items referenced in relation to the anchor item.

44. The method of claim 33, wherein prioritizing the attributes of the anchor item and the items in the comparison set comprises measuring like attributes of the items against each other and arranging the attributes in an order according to a degree that the like attributes distinguish the items from each other.

45. The method of claim 33, wherein the attributes are weighted such that attributes having greater weight have greater influence on ordering the attributes than attributes having lesser weight.

46. The method of claim 33, further comprising receiving feedback from a user regarding the item comparison, wherein the feedback includes a user action resulting in designation of another item to be the anchor item, the method further comprising producing a modified item comparison based on the newly-designated anchor item.

47. The method of claim 33, further comprising receiving feedback from a user regarding the item comparison, wherein the feedback includes a user indication of an attribute of interest, the method further comprising producing a modified item comparison in which the comparison set includes items that are most similar to the anchor item with respect to the attribute of interest.

48. The method of claim 33, wherein prioritizing the attributes of the anchor item and the other items in the comparison set comprises analyzing data reflecting prior user activity to determine user interest in an attribute and preparing the item comparison includes emphasizing an attribute determined to be of greater interest than another attribute in the item comparison.

49. The method of claim 48, wherein prioritizing the attributes further comprises measuring like attributes of the items and arranging the attributes in an order according to an emphasis based on like attributes that distinguish the items from each other and attributes of greater user interest.

50. The method of claim 33, further comprising configuring the comparison to present the anchor item first, followed by the items in the comparison set.

51. The method of claim 50, wherein the anchor item is presented first in a horizontal orientation with respect to the items in the comparison set.

52. The method of claim 50, wherein the anchor item is presented first in a vertical orientation with respect to the items in the comparison set.

53. The method of claim 50, wherein the comparison is further configured to present the anchor item first in any subsequent modification of the comparison.

54. A computing system, having a processor and a memory, configured to prepare an item comparison, comprising:

an item selector configured to identify two or more items for an item comparison;

an attribute prioritizer configured to programmatically determine an order of attributes of the identified items in which the attributes are prioritized based on an analysis of the attributes, such that including a different item in the item comparison can result in a different prioritized order of the attributes, wherein the prioritized order is based on a calculation of dissimilarity between attributes of the identified items; and an item comparison manager in communication with the item selector and the attribute prioritizer configured to prepare the item comparison in which the attributes of the identified items are presented in the prioritized order.

55. The computing system of claim 54, wherein the item comparison manager is configured to prepare the item comparison in real time after receiving a request for the item comparison.

56. A computer-accessible medium whose contents direct a computing system to:

(a) identify a first item for an item comparison;

(b) identify a comparison set of one or more other items for comparison with the first item;

(c) programmatically determine an order of attributes of the first item and the other items in the comparison set in which the attributes are prioritized based on an analysis of the attributes, such that including a different item in the comparison set can result in a different prioritized order of the attributes, wherein the prioritized order is based on a calculation of dissimilarity between attributes of the first item and attributes of the other items in the comparison set; and (d) produce the item comparison in which the attributes are configured for presentation in the prioritized order.

57. The computer-accessible medium of claim 56, wherein the contents of the medium further direct the computing system to provide the item comparison to a user in real time after receiving a request for the item comparison.

58. A system having a processor and a memory for providing an automated comparison of items to a first item, the system comprising:
(a) an input component configured to receive information representing a user action;
(b) a processing component that, in response to information received by the input component that represents a single user action, produces an item comparison by:
  (i) identifying a comparison set of one or more other items for comparison with the first item; and
  (ii) programmatically determining an order of attributes of the first item and the other items in the comparison set in which the attributes are prioritized based on an analysis of the attributes, such that including a different item in the comparison set can result in a different prioritized order of the attributes, wherein the prioritized order is based on a calculation of dissimilarity between attributes of the first item and attributes of the other items in the comparison set; and
(c) an output component configured to provide the item comparison produced by the processing component in which the attributes are configured for presentation in the prioritized order.

59. The system of claim 58, wherein the input component is accessible via an application programming interface that enables a third party in communication with a user to access the input component and provide information representing an action by the user.

60. The system of claim 58, wherein the output component is accessible via an application programming interface that enables a third party in communication with a user to access the output component and receive the item comparison.

61. The system of claim 58, wherein the output component is configured to provide the item comparison in which the items in the comparison are identified side-by-side with their attributes presented in the prioritized order.

62. The system of claim 58, wherein the information representing a single user action indicates user actuation of a mechanism that initiates an automated comparison of items without requiring the user to identify all of the items in the item comparison.

63. The system of claim 62, wherein the mechanism is a button.

64. The system of claim 62, wherein the mechanism is a link.

65. The system of claim 58, wherein the processing component is further configured to produce a modified item comparison in response to information representing a single user action indicating user interest in an attribute of the items in the item comparison.

66. The system of claim 58, wherein the processing component is further configured to produce a modified item comparison in response to information representing a single user action indicating user interest in an item in the comparison set, wherein the item of interest becomes the first item for the item comparison and the processing component identifies a new comparison set of one or more other items for comparison with the first item and determines a new order of attributes based on an analysis of the attributes of the items in the item comparison.

67. A computer-implemented method for an item comparison, comprising:
(a) from a client device, providing to a comparison engine an identification of a first item;
(b) in response to a single action of a user of the client device, providing to the comparison engine a signal to prepare an item comparison based on the first item; and
(c) receiving from the comparison engine a comparison of a set of items that includes the first item and one or more other items, the comparison comprising the items in the set and a prioritized order of attributes of the items in the set, the one or more other items in the set and the prioritized order of comparison attributes having been selected programmatically by the comparison engine in response to the signal, wherein the prioritized order is based on a calculation of dissimilarity between attributes of the first item and attributes of the one or more other items in the set.

68. The method of claim 67, wherein preparation of the item comparison is initiated without requiring the user to acknowledge a criterion used by the comparison engine to programmatically select the one or more other items for the item comparison.

69. The method of claim 67, further comprising, in response to a further single action of the user indicating an attribute of interest, providing to the comparison engine a signal to prepare a modified item comparison, wherein the modified item comparison includes one or more other items programmatically selected by the comparison engine based on at least the attribute of interest.

70. A computer-implemented method for an automated comparison of items, comprising:
(a) identifying, by a server, a first item for an item comparison;
(b) using multiple criteria, programmatically selecting, by the server, a comparison set of one or more other items for comparison with the first item; and
(c) producing the item comparison for output to a user display without prior user acknowledgement of the criteria used to identify the one or more other items in the item comparison, wherein attributes of the items in the item comparison are configured for presentation in a prioritized order that is based on a calculation of dissimilarity of the attributes.

71. The method of claim 70, wherein the first item is identified by a user.

72. The method of claim 70, wherein the first item is automatically identified from a type of item indicated by user activity.

73. The method of claim 70, wherein at least one of the multiple criteria used to select the one or more other items is based on data reflecting user activity in regard to the items.

74. The method of claim 73, wherein the data reflecting user activity includes a browse history comprising a record of one or more other items viewed by one or more users who also viewed the first item.

75. The method of claim 73, wherein the data reflecting user activity includes a purchase history comprising a record of one or more other items purchased by one or more users who previously viewed the first item.

76. The method of claim 73, wherein the data reflecting user activity includes a purchase history comprising a record of one or more other items viewed by one or more users who previously purchased the first item.

77. The method of claim 73, wherein the first item belongs to a category and the data reflecting user activity is limited to user activity in regard to items identified as belonging to the same category of items to which the first item belongs.

78. The method of claim 70, wherein at least one of the multiple criteria used to select the one or more other items is based on a search of pages having recognized text in said pages for reference to the first item and identification of other items referenced in relation to the first item.

79. The method of claim 70, wherein at least one of the multiple criteria used to select the one or more other items is based on a sales ranking of the items.

80. The method of claim 70, wherein at least one of the multiple criteria used to select the one or more other items is based on attributes of items that collectively are most similar to attributes of the first item.

81. The method of claim 80, wherein the attributes are weighted such that attributes having a greater weight have greater influence for selection of the items than attributes having lesser weight.

82. The method of claim 70, further comprising measuring like attributes of the items in the comparison set against each other and arranging the attributes for presentation to a user in an order according to a degree that the like attributes distinguish the items from each other.

83. The method of claim 70, further comprising analyzing data that reflects prior user activity to determine user interest in an attribute of an item, wherein producing the item comparison for output includes emphasizing an attribute determined to be of greater interest than another attribute in the item comparison.

84. The method of claim 83, wherein an attribute of greater user interest is emphasized in the item comparison by arranging the attribute higher in an order of the attributes.

85. The method of claim 70, wherein the items in the comparison set are selected in real time after receiving a request for the item comparison.

86. The method of claim 1, wherein the calculation of dissimilarity is a numerical analysis of the attributes that includes calculating a normalized score for each attribute of the one or more items in the comparison set and assessing a distance between the normalized scores of the attributes.

87. The method of claim 86, wherein the prioritized order is determined from the distances between the normalized scores of the attributes of the one or more items in the comparison set.

88. The method of claim 33, wherein the calculation of dissimilarity is a numerical analysis of the attributes that includes calculating a normalized score for each attribute of the items in the comparison set and assessing a distance between the normalized scores of the attributes.

89. The method of claim 88, wherein the prioritized order is determined from the distances between the normalized scores of the attributes of the items in the comparison set.

* * * * *

UNITED STATES PATENT AND TRADEMARK OFFICE
CERTIFICATE OF CORRECTION

PATENT NO. : 7,752,077 B2
APPLICATION NO. : 11/041522
DATED : July 6, 2010
INVENTOR(S) : Holden et al.

Page 1 of 1

It is certified that error appears in the above-identified patent and that said Letters Patent is hereby corrected as shown below:

COLUMN    LINE    ERROR

22    65    "(d) programmatically determining by the server,"
should read
--(d) programmatically determining, by the server,--

Signed and Sealed this

Sixteenth Day of November, 2010

David J. Kappos
*Director of the United States Patent and Trademark Office*